(12) United States Patent
Unno

(10) Patent No.: US 7,171,109 B2
(45) Date of Patent: Jan. 30, 2007

(54) APPARATUS AND METHOD FOR RECORDING AND REPRODUCING VIDEO DATA

(75) Inventor: Hiroaki Unno, Ichikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1150 days.

(21) Appl. No.: 09/986,201

(22) Filed: Nov. 7, 2001

(65) Prior Publication Data

US 2002/0054755 A1 May 9, 2002

(30) Foreign Application Priority Data

Nov. 8, 2000 (JP) ............................. 2000-340818

(51) Int. Cl.
- H04N 5/76 (2006.01)
- H04N 9/00 (2006.01)
- H04N 1/00 (2006.01)
- H04N 7/167 (2006.01)
- G11B 15/04 (2006.01)
- G11B 19/04 (2006.01)
- G06F 7/04 (2006.01)

(52) U.S. Cl. .................. 386/94; 386/109; 360/60; 380/201

(58) Field of Classification Search .............. 386/94, 386/1; 360/60; 380/60, 201, 203; 726/26
See application file for complete search history.

(56) References Cited

U.S. PATENT DOCUMENTS 6,603,576 B1 * 8/2003 Nakamura et al. ......... 358/3.28
6,802,011 B1 * 10/2004 Ogino ........................ 726/32

FOREIGN PATENT DOCUMENTS

| EP | 1 003 167 A2 | 5/2000 |
| EP | 1 052 644 A1 | 11/2000 |
| WO | WO 99/38167 | 7/1999 |

OTHER PUBLICATIONS

European Search Report dated Dec. 28, 2004, for European Application No. 01 12 6440.

* cited by examiner

Primary Examiner—Thai Tran
Assistant Examiner—Nigar Chowdhury
(74) Attorney, Agent, or Firm—Pillsbury Winthrop Shaw Pittman, LLP

(57) ABSTRACT

When a video source, which is not limited in the number of copying operations thereof, has been recorded, a reduced image thereof is created and stored in a recording medium. Upon thumbnail image display (upon execution of a thumbnail function), the reduced image is displayed at a high speed. On the other hand, when a video source, only one-generation recording of which is enabled, has been recorded, no reduced image is created (stored) so as to avoid "copy limitation violation". When the only-one-generation-copy-enabled video source mage has been recorded, the thumbnail display function is realized by storing, in the recording medium, a pointer indicative of the position of the original image of a thumbnail image in video data.

6 Claims, 2 Drawing Sheets

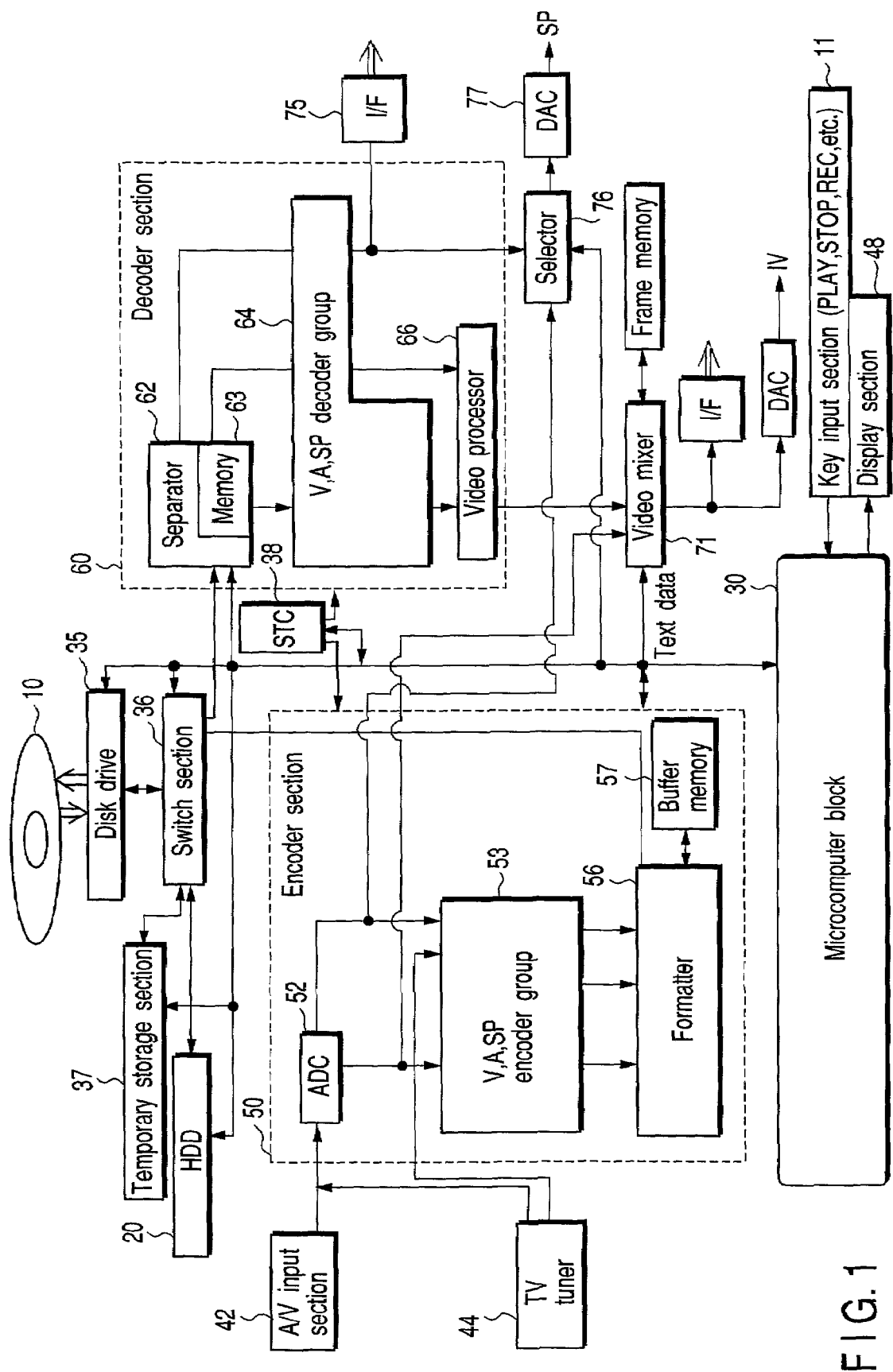
F I G. 1

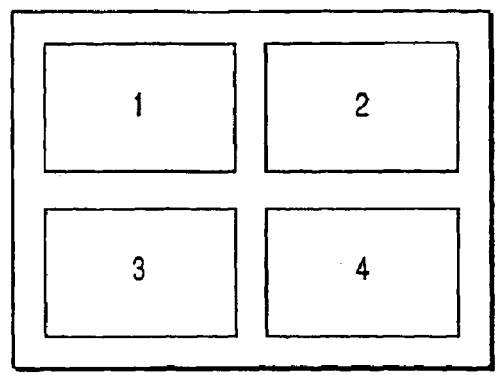
FIG. 2    Thumbnail display screen
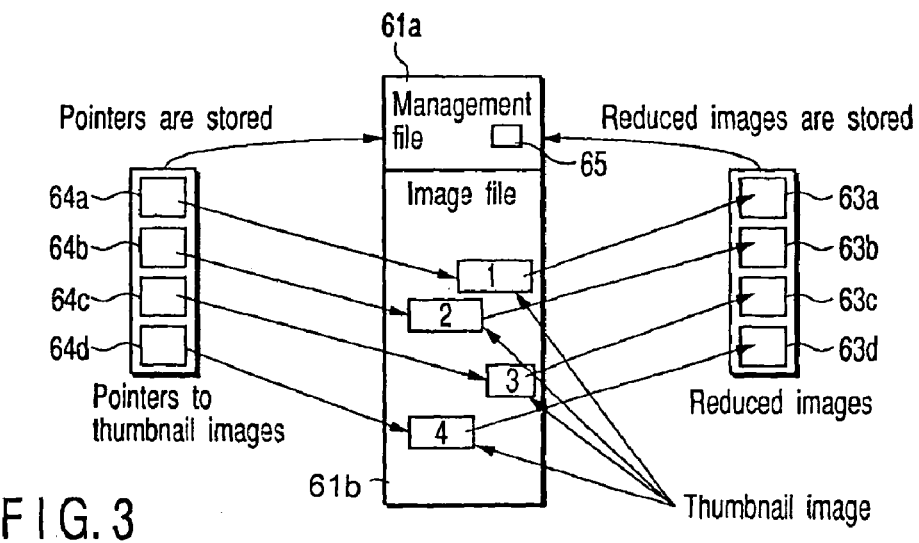
FIG. 3
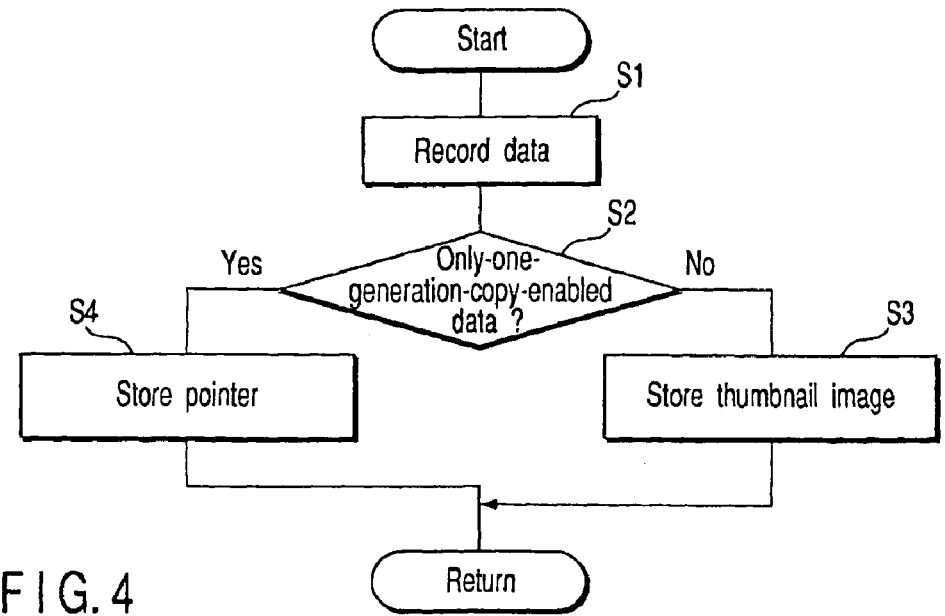
FIG. 4

APPARATUS AND METHOD FOR RECORDING AND REPRODUCING VIDEO DATA

CROSS REFERENCE TO RELATED APPLICATIONS

This application claims priority to Japanese application No. 2000-340818, filed Nov. 21, 2001, the content of which is incorporated herein in its entirety by reference.

BACKGROUND OF THE INVENTION

1. Field of the Invention

The present invention relates to a recording/reproducing apparatus with a function of reducing a designated image in video data, and storing it as a thumbnail image in a recording medium.

2. Description of the Related Art

A recording/reproducing apparatus using an easy-random-accessible medium such as a magnetic disk apparatus, employs a so-called thumbnail display function of displaying, on a screen, reduced images corresponding to several scenes (images) in recorded video data, which is used to facilitate the reproduction of a desired video data. This apparatus can display the reduced image in a short time by pre-creating the reduced image, pre-storing it as a thumbnail image in a recording medium or a memory device, and reproducing the pre-stored, reduced image at the time of thumbnail display.

Recently, the limitation that, for example, only one copying operation of broadcasted video data is enabled has come to be employed to satisfy a demand of a copyright owner. Video data obtained by a first copying operation will hereinafter be referred to as a "first-generation copy", and video data obtained by a second copying operation as a "second-generation copy". If a reduced image, which is created from video data once recorded in a recording medium incorporated in a magnetic disk apparatus, is recorded in a recording medium, the recorded, reduced image can be interpreted as a second-generation copy. Accordingly, it is possible that this reduced image may violate the limitation of allowing only-one-generation copy.

BRIEF SUMMARY OF THE INVENTION

It is an object of the present invention to provide a recording/reproducing apparatus capable of realizing a thumbnail function of displaying a reduced image in a short time if a "copy-unrestricted-enabled" video source, which is not limited in the number of copying operations thereof, is recorded, and also realizing the thumbnail function without violating the copy limitation if an "only-one-generation-copy-enabled" video source is recorded.

To attain the object, there is provided a recording/reproducing apparatus comprising: a video data storing section storing video data and a copy control information in a recording medium; a determination section determining, on the copy control information, whether the video data is only-one-generation-copy-enabled data or copy-unrestricted-enabled data; a reduced-image storing section reducing a designated image contained in the video data and storing the reduced image in the recording medium, if the determination section determines that the video data is the copy-unrestricted-enabled data; a inhibition section inhibiting a storage operation of the reduced-image storing section, if the determination section determines that the video data is the only-one-generation-copy-enabled data; and a video data reproduction section reproducing the video data stored in the recording medium by the video data storing section, based on the reduced image designated. For the video data, only first-generation copying of which is enabled by the copy control signal, information indicative of the storage position of the designated image is stored in the recording medium.

By virtue of this configuration, when video source which is not limited in the number of copying operations thereof has been recorded, a reduced image thereof is created and stored in the recording medium. At the time of thumbnail image display (at the time of execution of a thumbnail function), the reduced image is displayed at a high speed. On the other hand, when video source, only one-generation copying of which is enabled, has been recorded, no reduced image is created (stored) so as to avoid "copy limitation violation". However, even if the only-one-generation-copy-enabled video source is recorded, the thumbnail display function is realized by storing in the recording medium a pointer indicative of the position of the original image of a thumbnail image in the video data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and form a part of the specification, illustrate embodiments of the invention, and together with the general description given above and the detailed description of the given below, serve to explain the principles of the invention.

FIG. 1 is a block diagram illustrating the configuration of a recording/reproducing apparatus to which the present invention is applied;

FIG. 2 is a view illustrating a state in which four thumbnail images are displayed;

FIG. 3 is a view illustrating an example of data recorded on a disk; and

FIG. 4 is a flowchart illustrating the operation of the present invention executed when recording data.

DETAILED DESCRIPTION OF THE INVENTION

An embodiment of the present invention will be described in detail with reference to the accompanying drawings.

FIG. 1 is a block diagram illustrating the configuration of one embodiment of a recording/reproducing apparatus to which the present invention is applied. As shown, the recording/reproducing apparatus mainly comprises a hard disk device 20; a disk drive 35 which rotates an optical disk 10 as an information recording medium capable of constructing a video file, to thereby read or write data from or to the optical disk 10; an encoder section 50 providing a recording side; a decoder section 60 providing a reproducing side; and a microcomputer block 30 which controls the operations of the apparatus.

The encoder section 50 comprises an ADC (Analog Digital Converter) 52, an encoder group 53 which includes a V (Video) encoder, an A (Audio) encoder and an SP (Sub-picture) encoder, a formatter 56 which converts the output of each encoder into a predetermined format, and a buffer memory 57.

The ADC 52 receives external analog video/audio signals from an AV input section 42, or analog TV/voice signals from a TV (television) tuner 44.

The V encoder has a function of converting an input analog signal into a digital signal compressed at a variable bit-rate, on the basis of MPEG-2 or MPEG-1. The A encoder has a function of converting an input digital audio signal into a digital signal compressed at a fixed bit-rate or a linear PCM digital signal, on the basis of MPEG or AC-3.

When the AV input section 42 has input sub-picture information (for example, it has input a sub-picture signal from a DVD video player with an independent output terminal thereof), or when the TV tuner 44 has received a broadcasted DVD video signal of such data configuration, the SP encoder receives a sub-picture signal (a sub-picture pack) in the DVD video signal. The sub-picture signal input to the SP encoder is converted into a predetermined signal form and sent to the formatter 56.

The formatter 56 uses the buffer memory 57 as its work area so as to execute a predetermined signal process on an input video signal, audio signal or sub-picture signal, etc., and supplies a data processor 36 with record data agreeable to a predetermined format (file configuration) for the DVD.

In the apparatus, information input from the A/V input section 42 or the TV tuner 44 and encoded by the encoder section 50, and management information can be supplied to the hard disk device 20 via the data processor 36, and stored in a hard disk incorporated in the hard disk device 20. Further, information recorded in a hard disk can be recorded in the optical disk 10 via the data processor 36 and the disk drive 35. Furthermore, the information input from the A/V input section 42 or the TV tuner 44 and encoded by the encoder section 50, and the management information can be recorded in the optical disk 10 via the data processor 36 and the disk drive 35. In addition, information recorded in the optical disk 10 can be recorded in the hard disk device 20 via the disk drive 35 and the data processor 36.

Moreover, if the format of information recorded in a hard disk in the hard disk device 20 is identical to that used in the optical disk 10, the information can be recorded in the optical disk 10 without the encoding process.

On the other hand, if the format of information recorded in a hard disk in the hard disk device 20 differs from that used in the optical disk 10, the information can be recorded in the optical disk 10 after it is encoded by the encoder section 50.

The section, which reads and/or writes data (records and/or reproduces) from and/or to the optical disk 10, includes the disk drive 35 having an optical system and a driving system, the data processor 36, a temporary storage section 37 and an STC (System Time Counter or System Time Clock) 38.

The temporary storage section 37 is used to buffer a predetermined part of data (output from the encoder section 50) to be written to the optical disk 10 via the data processor 36 and the disk drive 35, or is used to buffer a predetermined part of data (to be input to the decoder section 60) reproduced from the optical disk 10 via the disk drive 35 and the data processor 36. The disk drive 35 includes a rotation control system for the optical disk, a laser driving system and an optical system, etc.

Under the control of the microcomputer block 30, the data processor 36 supplies the disk drive 35 with DVD record data output from the encoder section 50, reads from the disk drive 35 DVD reproduction data reproduced from the optical disk 10, rewrites the management information recorded in the optical disk 10, or erases data (a file or a video object) recorded in the optical disk 10.

The microcomputer block 30 includes an MPU (Micro Processing Unit) or a CPU (Central Processing Unit), a ROM which stores a system control program including a process executed by the present invention, and a RAM which provides a work area necessary to execute the program.

The MPU of the microcomputer block 30 executes the process by the present invention, defective place detection, non-recorded area detection, data-recording-position setting, AV address setting, etc., in accordance with the control program stored in the ROM, using the RAM as the work area.

Those of execution results of the MPU, which should be reported to the user of the disk drive 35, are displayed on a display section 48 incorporated in the DVD video recorder, or are OSD (On Screen Display) displayed on a monitor display.

The decoder section 60 comprises a separator 62 which separates and reads each pack from video data having a predetermined pack configuration for the DVD; a memory 63 used for the pack separation or other signal processing; a decoder group 64 including a V decoder which decodes main-video data (the contents of each video pack) separated by the separator 62, an SP decoder which decodes sub-picture data (the contents of each sub-picture pack) separated by the separator 62, and an A decoder which decodes audio data (the contents of each audio pack) separated by the separator 62; and a video processor 66 which appropriately synthesizes the main-video data obtained from the V decoder with sub-picture data obtained from the SP decoder, thereby outputting a main video data with a menu, a highlight button, a sub-title or another sub-picture superimposed thereon.

When outputting a digital signal from the A decoder, the signal is output to the outside of the apparatus via an interface (I/F) 75. On the other hand, when outputting an analog signal, a digital signal from the A decoder is converted into an analog one by a DAC 77 via a selector 76 and output to the outside. The selector 76 outputs one of a signal input from the TV tuner 44 or A/V input section 42 via the ADC 52, and a signal input from the decoder group 64. An analog audio signal is supplied to an external component (not shown) (e.g. a multi-channel stereo apparatus of 2channels to 6 channels).

A description will now be given of a process executed by the present invention when recording data. In the invention, when a "copy-unrestricted-enabled" video source has been recorded, a reduced image corresponding to a designated image is created, and is displayed at a high speed at the time of thumbnail image display. On the other hand, when an "only-one-generation-copy-enabled" video source has been recorded, "violation of copy limitation" is avoided by creating (storing) no reduced image of a designated image.

FIG. 2 is a view illustrating a state in which four thumbnail (index) images 1–4 are displayed. If an original image is of (720×480) pixels, its reduced image is of, for example, (240×160) pixels. Each thumbnail image corresponds to recorded video data (video program). When a thumbnail image is designated by a user, a corresponding video data is reproduced.

FIG. 3 is a view illustrating an example of data recorded on a disk. The data on the disk is divided into two areas—a management file 61a and a video file 61b. In FIG. 3, 1–4 boxes in the video file 61*b* indicate areas which store original images of thumbnail images 1–4. 63*a*–63*d* indicate data on respective reduced images corresponding to the original images. Further, 64*a*–64*d* are pointers which indicate the positions of the original images 1–4.

The operation of the recording/reproducing apparatus of the present invention will be described. To realize the thumbnail display function, the reduced image data or pointers are stored in the management file. In the case of storing only the pointers, it is necessary to access the video file 61*b*, and hence a longer time is required to execute a display than the case of storing contacted video data.

The storage of reduced image data can be interpreted as a second copying operation. Therefore, it is possible that the storage of reduced image data may involve a problem from the viewpoint of protection of a copyright owner. To avoid this, when a "copy-unrestricted-enabled" video source (original video data) has been recorded, reduced image data of an image in the video source is stored as thumbnail image data in the management file 61*a*, while when an "only-one-generation-copy-enabled" video source has been recorded, a pointer indicative of the storage position of the image in the optical disk 10 is stored in the management file 61a. This operation enables a thumbnail function to be realized by displaying the reduced image in a short time when a "copy-unrestricted-enabled" video source has been recorded, and enables the thumbnail function to be realized without violating the copy limitation, when an "only-one-generation-copy-enabled" video source has been recorded.

FIG. 4 is a flowchart illustrating the operation of the present invention executed when recording data. The microcomputer block 30 (see FIG. 1) records an video signal input from, for example, the TV tuner 44, and a copy control signal on the DVD-RAM 10, using, for example, the disk drive 35 (step S1). The copy control signal is multiplexed with, for example, the input video signal during a vertical blanking period. When an "only-one-generation-copy-enabled" video source has been recorded, the microcomputer block 30 stores copy control information 65 indicative of the copy limitation in the management file 61*a*, as is shown in FIG. 3, thereby inhibiting the copying of the stored video source or the creation (or storage) of the reduced image corresponding to the stored video source.

The microcomputer block 30 determines, from recorded data or the copy control information 65, etc., whether or not the recorded data contains a copy control signal which indicates "one-generation-copy allowance" for allowing only one-generation copy (step S2). When a "copy-unrestricted-enabled" video source has been recorded, the microcomputer block 30 stores, in the management file 61*a*, reduced image data corresponding to a designated original image as thumbnail image data, as is shown in FIG. 3.

If the copy control information 65, for example, indicates that recorded data contains the copy control signal indicative of "one-generation-copy allowance", i.e. if the storage of a reduced image corresponding to the recorded data is inhibited, the microcomputer block 30 stores, in the management file 61*a*, a pointer indicative of the storage position of the designated original image. In the management file 61*a*, the pointer is stored as an index pointer in the DVD standard.

As a result, when a "copy-unrestricted-enabled" video source has been recorded, a corresponding thumbnail image is displayed in a short time, while when an "only-one-generation-copy-enabled" video source has been recorded, the thumbnail function is realized without violating the copy limitation.

The apparatus may be controlled to automatically designate a thumbnail image or the storage position (pointer) of an original image. Alternatively, the apparatus may be controlled such that the user can execute the designation using a key input section 11, while monitoring, on a display screen (not shown), an video data which is being recorded or has been recorded.

Further, the pointer is also stored in the management file 61*a* when a "copy-unrestricted-enabled" source image has been recorded. Moreover, when an "only-one-generation-copy-enabled" video source has been recorded, and only a pointer is stored without storing a corresponding reduced image, as in the case of a step S4, a message that a reduced image corresponding to the "only-one-generation-copy-enabled" video source cannot be stored may be displayed on the display screen.

When reproducing video data, the microcomputer block 30 responds to user's instruction to reproduce the data, thereby displaying, on the display screen as shown in FIG. 2, reduced images corresponding to the pointers 64*a*–64*d*, and the reduced images 63*a*–63*d* as thumbnail images, which are stored in the optical disk as shown in FIG. 3 in the manners illustrated at the steps S3 and S4 of FIG. 4. When the user has selected one thumbnail image, the microcomputer block 30 determines and reproduces video data in the video file 61*b*, which corresponds to the selected thumbnail image, on the basis of a pointer corresponding to the selected thumbnail image, thereby displaying the reproduced video data on the display screen.

Although a description has been given of a recording/reproducing apparatus and method according to the embodiment of the invention, the invention is not limited to them. It is apparent that the invention is also applicable to an information recording medium such as a ROM or an optical disk which stores a control program as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing apparatus comprising:
   a video data storing section storing video data and a copy control information in a recording medium;
   a determination section determining, on copy control information, whether the image data is only-one-generation-copy-enabled data or copy-unrestricted-enabled data;
   a reduced-image storing section reducing a designated image contained in the video data and storing the reduced image in the recording medium, if the determination section determines that the image data is the copy-unrestricted-enabled data;
   a inhibition section inhibiting a storage operation of the reduced-image storing section, if the determination section determines that the video data is the only-one-generation-copy-enabled data; and
   a video data reproduction section reproducing the video data stored in the recording medium by the video data storing section, based on the reduced image designated.

2. The recording/reproducing apparatus according to claim 1, further comprising a position information storing section storing, in the recording medium, position information indicative of a storage position of the designated image contained in the stored video data, if the determination section determines that the video data is the only-one-generation-copy-enabled data, and wherein the video data reproduction section reproduces the video data stored in the recording medium based on one of the position information and reduced image designated.

3. The recording/reproducing apparatus according to claim 1, further comprising a displaying section displaying a message that the reduced image cannot be stored, if the determination section determines that the video data is the only-one-generation-copy-enabled data.

4. A method for recording and reproducing video data, comprising:
 storing video data and a copy control information in a recording medium;
 determining whether the video data is only-one-generation-copy-enabled data or copy-unrestricted-enabled data, based on the copy control signal;
 reducing a designated image contained in the video data and storing the reduced in the recording medium, if the video data is determined to be the copy-image unrestricted-enabled data;
 inhibiting storage of the reduced image if the video data is determined to be the only-one-generation-copy-enabled data; and
 reproducing the video data stored in the recording medium when the reduced image has been designated.

5. The method according to claim 4, further comprising storing, in the recording medium, position information indicative of a storage position of the designated image contained in the stored video data, if the video data is determined to be the only-one-generation-copy-enabled data.

6. The method according to claim 4, further comprising displaying a message that the reduced image cannot be stored, if the video data is determined to be the only-one-generation-copy-enabled data.

* * * * *